United States Patent [19]

Marchetti

[11] Patent Number: 4,796,865
[45] Date of Patent: Jan. 10, 1989

[54] FISHTAPE FEEDING TOOL

[76] Inventor: Steve Marchetti, 6827 E. Broadway, Burnaby, British Columbia V5B 2Y7, Canada

[21] Appl. No.: 67,156

[22] Filed: Jun. 29, 1987

[51] Int. Cl.⁴ ............................................. B65H 59/00
[52] U.S. Cl. .................... 254/134.3 FT; 254/134.3 R; 254/389; 285/127; 285/177
[58] Field of Search ............... 254/134.32, 134.3 PT, 254/134.4, 389; 242/157; 226/196; 174/68 C, 71 R; 138/92, 103, 108; 285/16, 17, 127, 177, 179

[56] References Cited

U.S. PATENT DOCUMENTS

| | | | |
|---|---|---|---|
| 749,392 | 1/1904 | Lutz | 285/127 |
| 1,799,783 | 4/1931 | Church | 285/177 |
| 2,649,746 | 8/1953 | Taylor | 254/389 |
| 3,038,702 | 6/1962 | Trunnell | 29/272 |
| 3,201,090 | 8/1965 | Jones | 254/134.3 FT |
| 3,306,581 | 2/1967 | Miller | 254/134.3 FT |

*Primary Examiner*—Frederick R. Schmidt
*Assistant Examiner*—Judy J. Hartman

[57] ABSTRACT

A fishtape feeding tool adapted to be held in position relative to a conduit is disclosed. It is comprised of an elongated hollow body having a generally straight section at a first open end and a curved section at a second open end. The body has a slot extending longitudinally between the open ends to enable the tool to be removed from the fishtape. A receptacle groove at the second end is provided and a hollow cylindrical plug having a first end adapted to be received by the receptacle groove and a second end for inserting in the conduit is also provided. The plug has a slot longitudinally thereof adapted to be aligned with the body slot when the tool is removed. A removable cover for attachment to the body to cover the slot from the first open end to a point near the second end and a resilient clamp means for holding the cover means to the body are provided.

11 Claims, 2 Drawing Sheets

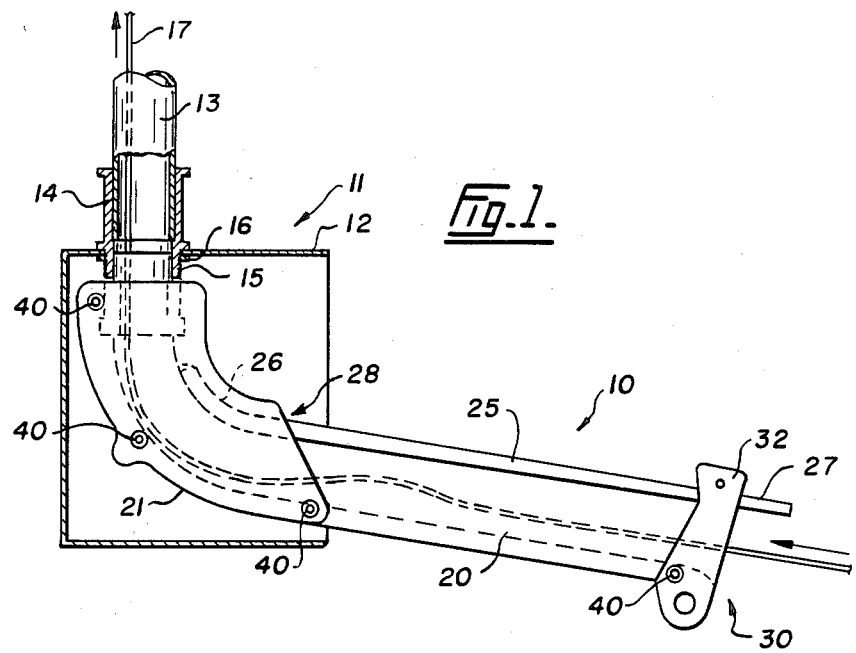
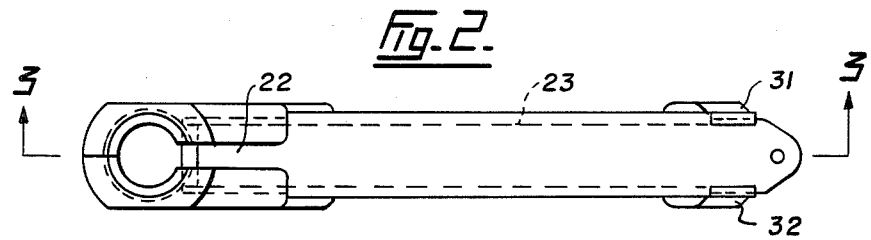
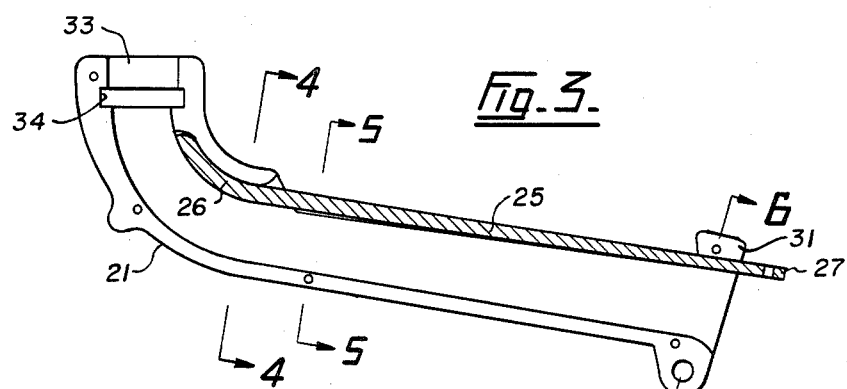
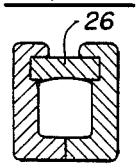 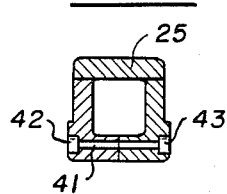 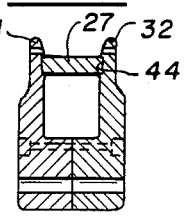

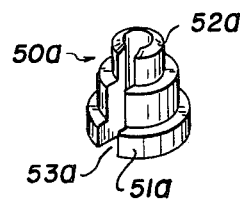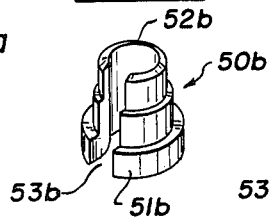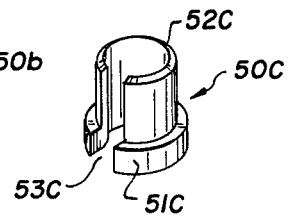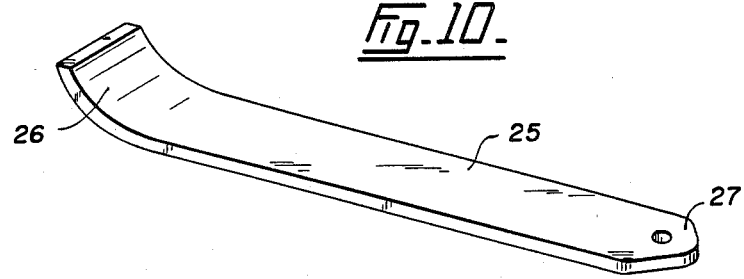

4,796,865

FISHTAPE FEEDING TOOL

FIELD OF THE INVENTION

This invention relates to a feeding guide for wires but more particularly to a tool adapted to permit feeding of a fishtape into a conduit.

DESCRIPTION OF THE PRIOR ART

Wire feeders and guiding tools have been used in order to ease the insertion of wires into electrical conduits. Such a wiring guide is disclosed in U.S. Pat. No. 3,038,702 which issued to Trunnell. In this patent a wire guiding device is disclosed having a funnel-like member with an enlarged entrance bell at one end and an opposite end having a reduced diameter adapted to fit into or abut against a conduit. In addition, the feeder is provided with a split longitudinally to allow the user to remove the tool from a strand of wire.

The problem associated with the aforementioned wire guiding device is the difficulty a user has in properly holding the guide while working. This becomes especially difficult when a fishtape becomes jammed in a conduit having a sharp bending angle. The user has to push and pull the fishtape using one hand while holding the guiding device with another hand. Because of its shape, the Trunnell device allows slippage of the hand towards the electrical box, thereby facing the risk of injury to the worker. In addition, in most instances, the electrical box where access is required by the installer, is relatively difficult to reach and fairly limited in space. Accordingly, the use of a feeder device such as disclosed by Trunnell becomes relatively difficult because of the bulky shape of the feeder. In addition, the feeder design which includes a hinge may present additional difficulty to the user when the feeder is open to remove the feeder from a strand of wire, especially in areas where space is restricted.

There is, therefore, a requirement for a fishtape feeding tool designed to allow its user to forcefully hold the tool while working in confined areas while still be easily removable from a strand of wire.

SUMMARY OF THE INVENTION

It is therefore an object of the present invention to provide a fishtape feeding tool adapted to reach electrical conduits in electrical boxes 309–19 still permit feeding of a fishtape in a conduit at a relatively gentle angle.

Another object of the present invention is to provide a fishtape feeding tool adapted to be firmly held while allowing the user to forcefully push and pull a fishtape therethrough.

Yet another object of the present invention is to provide a fishtape feeding tool which is easily removable from a strand of wire while still be accessible to confined spaces in electrical boxes.

Another object of the present invention is to provide a fishtape feeding tool adapted to fit the standard sizes of electrical conduits.

Another object of the present is to provide a fishtape feeding tool which is designed so as to be easily and cheaply manufactured.

Accordingly, an aspect of the present invention is to provide a fishtape feeding tool adapted to be held in a position relative to a conduit, comprising:

an elongated hollow body having a generally straight section at a first end and a curved section at a second end, said first and second end being open, said body having a slot extending longitudinally between said open ends to enable said tool to be removed from said fishtape;

receptacle means at said second end;

a hollow cylindrical plug having a first end adapted to be received by said receptacle means and a second end for inserting in said conduit, said plug having a slot longitudinally thereof adapted to be aligned with said body slot when said tool is removed;

removable cover means for attachment to said body to cover said slot from said first open end to a point near said second end; and resilient clamp means for holding said cover means to said body.

DESCRIPTION OF THE DRAWINGS

Particular embodiments of the invention will be understood in conjunction with the accompanying drawings in which:

FIG. 1 is an illustrated view of the fishtape feeding tool of the present invention held against an electrical conduit;

FIG. 2 is a top view of the fishtape feeding tool;

FIG. 3 is a sectional view thereof;

FIG. 4 is a sectional view taken along lines 4—4 of FIG. 3;

FIG. 5 is a sectional view taken along lines 5—5 of FIG. 3;

FIG. 6 is a sectional view taken along lines 6—6 of FIG. 3;

FIGS. 7, 8 and 9 are isometric views of the fitting plugs adapted to permit the fishtape tool to be held in conduits of various sizes; and FIG. 10 is an isometric view of the cover used with the feeding tool of the present invention.

DESCRIPTION OF THE PREFERRED EMBODIMENTS

Referring now to FIG. 1, we have shown the feeding tool of the present invention as generally shown by references number 10 inserted into an electrical wiring box generally shown at reference numeral 11. Electrical connecting box 11 is comprised of a housing 12 to which is connected a conduit 13 via a connector 14. Connector 14 has an interior diameter larger in size than the exterior diameter of conduit 13. It is provided with a threaded section 15 partially inserted into housing 12 and secured therethrough by means of a threaded nut 16.

Once installed, electrical wires are fed into conduit 13 by means of a fishtape 17 adapted to lead the electrical wires into conduit 13 to the next electrical box.

Fishtape feed tool 10 allows a smoother insertion of fishtape 17 into conduit 13. Fishtape feeding tool 10 is comprised of an elongated hollow body having a generally straight section 20 at a first end a curved section 21 at the opposite end. Curved section 21 allows for the smoother insertion of fishtape 15 into conduit 13.

As shown in FIG. 2, the tool includes a slot 22 which extends narrowly at curved section 21 and widens to the width of the tool as depicted by phantom lines 23 along the straight section 20. The slot allows the insertion and removal of the tool from a strand of wire or from the fishtape itself. This slot is closed by means of a cover 25 having a curved section 26 and a generally straight section 27. As shown in FIGS. 1 and 3. Cover 25 is secured to fish tool 10 by means of a cavity 28 into which is inserted the curved portion 22 of cover 25. Straight end 27 of cover 25 is mounted to end 20 of tool 10 by means of a resilient clamp 30 integral with straight end 20 of tool 10. Clamp 30 is comprised of a pair laterally positioned members 31 and 32 adapted to yield outwardly when cover 25 is fitted above the straight end 20 of tool 10.

Near the open end 33 of curved section 21 is an internal radial groove 34 adapted to receive the various fitting plugs shown in FIGS. 7, 8 and 9. As shown in FIGS. 4, 5 and 6, the body of the feeding tool is separated into two parts secured together by means of fasteners 40 shown in FIG. 1. At each fastener, is located an aperture 41 including a cavity 42 and 43 of larger cross-sectional extent than aperture 41. These cavities allow the screwhead and nut to be recessed within the body of the feeding tool. As shown in FIG. 6, member 31 and 32 has a grooved area 44 adapted to receive cover 25 when inserted and positioned above the slot. The interior of the feeding tool has a generally rectangular shape for ease of manufacturing. However, a cylindrical shape can also be used achieving the same purpose.

Referring now to FIGS. 7, 8 and 9, we have shown isometric views of the fitting plugs used in holding the feeding tool against a conduit. Plugs 50a, 50b and 50c are adapted for use with conduits having ½", ¾" and 1" sizes, respectively. Each plug has at one end an external radial ridge 51a, 51b and 51c adapted to be received into inner groove 34 of the feeding tool. The top end 52a, 52b and 52c is adapted to be instered into the extended end 15 of conduit connector 14. Each plug is provided with a slot 53a, 53b and 53c longitudinally thereof and adapted to be aligned with slot 22 of the feeding tool.

I claim:

1. A fishtape feeding tool adapted to be held in position relative to a conduit, comprising:
   an elongated hollow body having a generally straight section at a first end and a curved section at a second end, said first and second end being open, said body having a slot extending longitudinally between said open ends to enable said tool to be removed from said fishtape;
   receptacle means at said second end;
   a hollow cylindrical plug having a first end adapted to be received by said receptacle means and a second end for inserting in said conduit, said plug having a slot longitudinally thereof adapted to be aligned with said body slot when said tool is removed;
   removable cover means for attachment to said body to cover said slot from said first open end to a point near said second end; and
   resilient clamp means for holding said cover means to said body.

2. A tool as defined in claim 1 wherein said receptacle means comprises an internal radial groove positioned near said second open end.

3. A tool as defined in claim 2 wherein said first end of said plug includes an outer radial ridge adapted to be received by said groove when said plug is inserted into said second open end.

4. A tool as defined in claim 3 wherein said first end of said plug has an exterior diameter adapted to fit a ½" conduit.

5. A tool as defined in claim 3 wherein said first end of said plug has an exterior diameter adapted to fit a ¾" conduit.

6. A tool as defined in claim 3 wherein said first end of said plug has an exterior diameter adapted to fit a 1" conduit.

7. A tool as defined in claim 1 wherein said removable cover means is comprised of a generally flat body having a generally straight section at a first end and a curved section at a second end.

8. A tool as defined in claim 7 wherein said hollow body is generally rectangular in cross-section, said second end having a cavity adapted to receive said second end of said cover means.

9. A tool as defined in claim 8 wherein said resilient clamp means is integrally connected to said first end of said hollow body.

10. A tool as defined in claim 9 wherein said resilient clamp means comprises a pair of laterally positioned members, each having a groove adapted to receive said first end of said cover means.

11. A tool as defined in claim 10 wherein said body is made of high resistance resilient plastic.

* * * * *